United States Patent
Noh et al.

(10) Patent No.: US 11,374,231 B2
(45) Date of Patent: Jun. 28, 2022

(54) CONNECTING MATERIAL FOR SOLID OXIDE FUEL CELL, MANUFACTURING METHOD THEREFOR, AND SOLID OXIDE FUEL CELL

(71) Applicants: LG CHEM, LTD., Seoul (KR); DAEGU GYEONGBUK INSTITUTE OF SCIENCE AND TECHNOLOGY, Daegu (KR)

(72) Inventors: Tai Min Noh, Daejeon (KR); Changseok Ryoo, Daejeon (KR); Daehwan Kim, Daejeon (KR); Kang Taek Lee, Daegu (KR); Kwangwook Choi, Daejeon (KR); Kwangyeon Park, Daejeon (KR); Dong Woo Joh, Daegu (KR); Imdadullah Thaheem, Daegu (KR)

(73) Assignees: LG CHEM, LTD.; DAEGU GYEONGBUK INSTITUTE OF SCIENCE AND TECHNOLOGY

( * ) Notice: Subject to any disclaimer, the term of this patent is extended or adjusted under 35 U.S.C. 154(b) by 116 days.

(21) Appl. No.: 16/755,186

(22) PCT Filed: Oct. 19, 2018

(86) PCT No.: PCT/KR2018/012417
§ 371 (c)(1),
(2) Date: Apr. 10, 2020

(87) PCT Pub. No.: WO2019/078674
PCT Pub. Date: Apr. 25, 2019

(65) Prior Publication Data
US 2021/0194017 A1    Jun. 24, 2021

(30) Foreign Application Priority Data
Oct. 20, 2017 (KR) .................. 10-2017-0136479

(51) Int. Cl.
*H01M 8/0217* (2016.01)
*H01M 8/0228* (2016.01)
(Continued)

(52) U.S. Cl.
CPC ......... *H01M 8/0217* (2013.01); *H01M 8/021* (2013.01); *H01M 8/0228* (2013.01); *H01M 2008/1293* (2013.01)

(58) Field of Classification Search
CPC ......... H01M 2008/1293; H01M 8/021; H01M 8/0217; H01M 8/0228; H01M 8/2425
See application file for complete search history.

(56) References Cited

U.S. PATENT DOCUMENTS

| 9,276,272 B2 | 3/2016 | Lee et al. |
| 2004/0038105 A1 | 2/2004 | Hennige et al. |

(Continued)

FOREIGN PATENT DOCUMENTS

| JP | 2004515351 | 5/2004 |
| JP | 2016189243 | 11/2016 |

(Continued)

OTHER PUBLICATIONS

Xianshuang Xin et al. "Development of the spinel powder reduction technique for solid oxide fuel cell interconnect coating" International Journal of Hydrogen Energy, 37:471-476 (2012).
International Search Report corresponding to PCT/KR2018/012417, dated Jan. 29, 2019 (5 pages including English translation).
(Continued)

*Primary Examiner* — Sarah A. Slifka
*Assistant Examiner* — Rachel L Zhang
(74) *Attorney, Agent, or Firm* — Myers Bigel, P.A.

(57) ABSTRACT

The present specification relates to an interconnect for a solid oxide fuel cell, a method for preparing the same, and a solid oxide fuel cell.

16 Claims, 9 Drawing Sheets

(51) Int. Cl.
*H01M 8/021* (2016.01)
*H01M 8/12* (2016.01)

(56) References Cited

U.S. PATENT DOCUMENTS

| | | | | |
|---|---|---|---|---|
| 2007/0003819 | A1* | 1/2007 | Zhang | H01M 8/0236 |
| | | | | 429/433 |
| 2008/0026279 | A1* | 1/2008 | Kobuchi | H01M 8/0258 |
| | | | | 429/482 |
| 2013/0143141 | A1* | 6/2013 | Kim | B23K 35/302 |
| | | | | 429/468 |
| 2013/0230792 | A1 | 9/2013 | Wilson et al. | |
| 2015/0118597 | A1 | 4/2015 | Lee et al. | |
| 2016/0190614 | A1* | 6/2016 | Striker | H01M 4/886 |
| | | | | 429/512 |
| 2017/0088930 | A1* | 3/2017 | Ibe | C09D 5/024 |
| 2017/0110746 | A1* | 4/2017 | Mack | H01M 8/04477 |

FOREIGN PATENT DOCUMENTS

| | | |
|---|---|---|
| KR | 1020150049384 | 5/2015 |
| KR | 1020170026904 | 3/2017 |

OTHER PUBLICATIONS

Brylewski et al. "Structure and electrical properties of Cu-doped Mn-Co-O spinel prepared via soft chemistry and its application in intermediate-temperature solid oxide fuel cell interconnects" Journal of Power Sources, 333:145-155 (2016).

Gavrilov et al. "Investigations of Mn-Co-O and Mn-Co-Y-O coatings deposited by the magnetron sputtering on ferritic stainless steels" Surface & Coatings Technology, 206:1252-1258 (2011).

Molin et al. "Protective coatings for stainless steel for SOFC applications" J Solid State Electrochem, 13:1695-1700 (2009).

Xu et al. "Cu doped Mn-Co spinel protective coating on ferritic stainless steels for SOFC interconnect applications" Solid State Ionics, 192:561-564 (2011).

\* cited by examiner $Mn_{1.4-0.5x}Co_{1.4-0.5x}Cu_xY_{0.1}O_4$

CONNECTING MATERIAL FOR SOLID OXIDE FUEL CELL, MANUFACTURING METHOD THEREFOR, AND SOLID OXIDE FUEL CELL

CROSS REFERENCE TO RELATED APPLICATIONS

This application is a 35 U.S.C. § 371 national stage application of PCT International Application No. PCT/KR2018/012417, filed Oct. 19, 2018, which claims priority from Korean Patent Application No. 10-2017-0136479, filed Oct. 20, 2017, the contents of which are incorporated herein in their entireties by reference. The above-referenced PCT International Application was published in the Korean language as International Publication No. WO 2019/078674 on Apr. 25, 2019.

TECHNICAL FIELD

The present disclosure relates to an interconnect for a solid oxide fuel cell, a method for preparing the same, and a solid oxide fuel cell comprising an interconnect for a solid oxide fuel cell.

BACKGROUND ART

With recent predictions about the depletion of existing energy resources such as petroleum and coal, interests in alternative energy capable of replacing these have been growing. As one of such alternative energy, fuel cells have received particular attention with advantages of being highly efficient, not emitting pollutants such as NOx and SOx, and having sufficient fuels to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells comprise polymer electrolyte-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

FIG. 11 and FIG. 12 schematically illustrate a structure and a principle of electricity generation of a solid oxide-type fuel cell, and the solid oxide-type fuel cell is formed with an electrolyte, and a fuel electrode (anode) and an air electrode (cathode) formed on both surfaces of this electrolyte. When referring to FIG. 12 showing a principle of electricity generation of a solid oxide-type fuel cell, air is electrochemically reduced in an air electrode to produce oxygen ions, and the produced oxygen ions are transferred to a fuel electrode through an electrolyte. In the fuel electrode, a fuel such as hydrogen, methanol or butane is injected, and the fuel releases electrons while bonding to the oxygen ions and electrochemically oxidized to produce water. Through such a reaction, electrons migrate to an external circuit.

An interconnect is a core component of a solid oxide fuel cell (SOFC) performing a role of separating fuel and air while electrically connecting unit cells.

Recently proposed metals may comprise alloy steel comprising Fe-based alloy series Cr (16% to 22%) (example: Crofer22APU of ThyssenKrupp AG, Germany, ZMG232 of Hitachi Metals, Ltd., Japan, and the like), and extensive studies for using these metals have been progressed since, compared to other metals, these have advantages of having excellent processability and a similar coefficient of thermal expansion with electrode materials. However, when using a Fe—Cr-based metal as an interconnect, volatile chromium such as $CrO_2(OH)$ is produced from the metal under a high temperature oxidizing atmosphere causing a problem of reducing catalyst activity of an electrolyte and a cathode of each cell and a problem of generating high contact resistance due to the influence of a non-conductive oxide produced on the metal surface. Accordingly, securing a metal interconnect material having high corrosion resistance and high conductivity surface properties is an important technological matter. Methods for improving this may comprise developing new alloy materials so as to meet functions required for a separation plate, or surface treating the surface with conductive metal or non-metal coating, or the like.

Recently, attempts to coat an existing commercial metal surface with a protective layer have been made, and various coating methods such as an electroplating method, a sputtering deposition method or a plasma spray coating method have been tried, however, the costs for coating is high and there are difficulties in selecting coating conditions, and therefore, improvements thereon have been required.

DISCLOSURE

Technical Problem

One embodiment of the present specification is directed to providing an interconnect for a solid oxide fuel cell comprising a ceramic protective layer.

Another embodiment of the present specification is directed to providing a method for preparing an interconnect for a solid oxide fuel cell.

Still another embodiment of the present specification is directed to providing a solid oxide fuel cell comprising the interconnect for a solid oxide fuel cell.

Technical Solution

One embodiment of the present specification provides an interconnect for a solid oxide fuel cell comprising a conductive substrate; and a ceramic protective layer provided on one surface or both surfaces of the conductive substrate, wherein the ceramic protective layer comprises a spinel structure oxide represented by the following Chemical Formula 1.

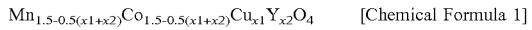

$Mn_{1.5-0.5(x1+x2)}Co_{1.5-0.5(x1+x2)}Cu_{x1}Y_{x2}O_4$      [Chemical Formula 1]

In Chemical Formula 1, x1 and x2 represent molar ratios of Cu and Y, respectively, and satisfy ranges of $0<x1\leq0.9$ and $0<x2\leq0.5$.

Another embodiment of the present specification provides a method for preparing an interconnect for a solid oxide fuel cell comprising forming a ceramic protective layer comprising a compound having a spinel structure represented by Chemical Formula 1 on one surface or both surfaces of a conductive substrate.

Still another embodiment of the present specification provides a solid oxide fuel cell comprising two or more unit cells; and an interconnect layer comprising an interconnect for a solid oxide fuel cell provided between the two or more unit cells, wherein the unit cell comprises a fuel electrode, an air electrode, and an electrolyte provided between the fuel electrode and the air electrode, and the interconnect layer adjoins the air electrode or the fuel electrode of the unit cell.

Advantageous Effects

An interconnect for a solid oxide fuel cell according to one embodiment of the present specification is capable of effectively suppressing oxide layer formation between a ceramic protective layer and a metal conductive substrate caused by chrome gas evaporation, and through this, effects of preventing decline in the electrical properties of the interconnect and similar thermal properties with the conductive substrate are obtained.

The interconnect for a solid oxide fuel cell according to one embodiment of the present specification is effective in suppressing oxide layer growth on a metal conductive substrate surface and metal volatilization.

A method for preparing an interconnect for a solid oxide fuel cell according to one embodiment of the present specification is capable of minimizing cracking and peeling of a ceramic protective layer and a metal conductive substrate, and is capable of increasing a connection area of the coating layer and the conductive substrate.

A solid oxide fuel cell according to one embodiment of the present specification is effective in preventing electrical property decline even when driven for a long period of time.

REFERENCE NUMERAL

Figure 1:
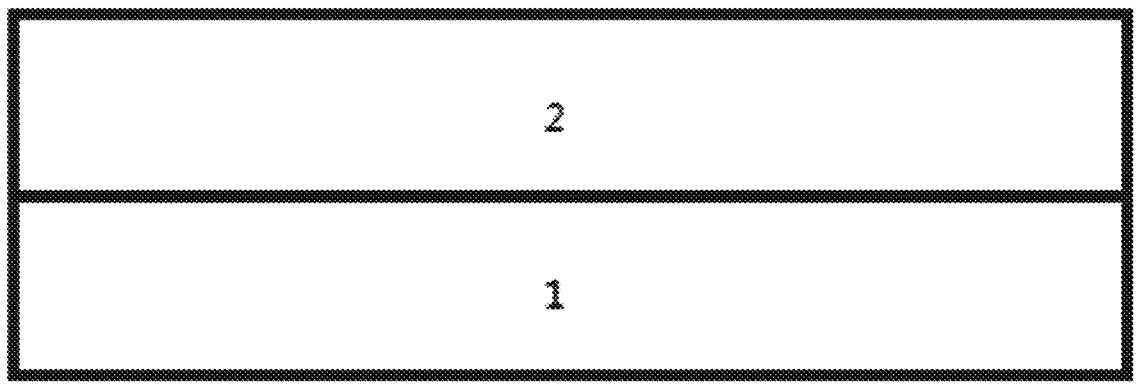
FIG. 1 is a sectional view illustrating an interconnect for a solid oxide fuel cell according to one embodiment of the present specification.

1: Conductive Substrate
2: Ceramic Protective Layer

MODE FOR DISCLOSURE

Hereinafter, the present specification will be described in more detail.

In the present specification, "or" represents selectively or all comprising those listed, that is, "and/or", unless defined otherwise.

In the present specification, a "layer" means covering 70% or higher of an area in which the corresponding layer is present. It means covering preferably 75% or higher, and more preferably 80% or higher.

In the present specification, a "thickness" of a certain layer means a shortest distance from a lower surface to an upper surface of the corresponding layer.

In the present specification, "adjoining" means any one constitution being in physical contact with another constitution, and does not mean that the another constitution is in contact with the whole surface of the any one constitution for binding, and means that most of the any one constitution is in contact for binding, and even when a part thereof is separated, the separated part also faces the corresponding surface.

In the present specification, "comprise" means capable of further comprising other constitutions.

In the present specification, a "paste" may mean a composition comprising the same composition.

Interconnect for Solid Oxide Fuel Cell

One embodiment of the present specification provides an interconnect for a solid oxide fuel cell comprising a conductive substrate; and a ceramic protective layer provided on one surface or both surfaces of the conductive substrate, wherein the ceramic protective layer comprises a compound having a spinel structure represented by the following Chemical Formula 1.

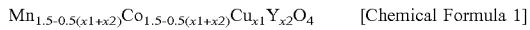

$$Mn_{1.5-0.5(x1+x2)}Co_{1.5-0.5(x1+x2)}Cu_{x1}Y_{x2}O_4 \quad \text{[Chemical Formula 1]}$$

In Chemical Formula 1, x1 and x2 represent molar ratios of Cu and Y, respectively, and satisfy ranges of $0<x1\leq0.9$ and $0<x2\leq0.5$.

In one embodiment of the present specification, the ceramic protective layer may further other compounds in addition to the compound having a spinel structure represented by Chemical Formula 1.

The interconnect for a solid oxide fuel cell is a constitution electrically connecting unit cells of a solid oxide fuel cell while physically separating the unit cells, and performing a role of a path for fuel and air supplied to each of the unit cells. The interconnect for a solid oxide fuel cell may be referred to as a "separator" depending on a fuel cell function.

Metal materials are generally used as the conductive substrate, however, compared to ceramic materials, a problem of performance degradation may occur on a fuel cell stack due to an oxidation of the metal material. Specifically, when exposed to an oxidizing atmosphere, that is, air or water vapor, for a long period of time at a solid oxide fuel cell-operating temperature of approximately 800° C., an insulating oxide layer having high electrical resistance grows on the metal surface increasing electrical resistance of the stack, which causes a problem of performance decline.

In addition, when a material such as an iron-chromium (Fe—Cr) alloy as the conductive substrate is brought into contact with oxygen at a high temperature, highly volatile chromium oxide (CrOx) is formed, and chromium atoms (Cr) volatilized from the metal are deposited on the electrode surface reducing the number of reaction points of the electrode and declining electrode performance.

In view of the above, the inventors of the present disclosure have attempted to resolve the problems described above by introducing a ceramic protective layer comprising the compound having a spinel structure represented by Chemical Formula 1 on one surface or both surfaces of a conductive substrate to form a ceramic protective layer having a dense structure, and thereby preventing gas permeation above the metal.

Particularly, when molar ratios of manganese (Mn) and cobalt (Co) satisfy the ranges of Chemical Formula 1, and molar ratios of copper (Cu) and yttria (Y) satisfy the x1 and x2 ranges of Chemical Formula 1, respectively, effects of excellent thermal compatibility with other constitutions of the interconnect and low surface resistance properties are obtained.

For example, when the copper content is too high, a coefficient of thermal expansion excessively changes, and secondary phases with over-concentrated copper (Cu) are locally formed decreasing electrical conductivity.

However, when the copper content is adjusted to a certain range level, the degree of sintering increases due to a low melting point of copper making the distance between particles closer, which resultantly leads to an effect of increasing electrical conductivity.

In one embodiment of the present specification, the compound having a spinel structure represented by Chemical Formula 1 may have electrical conductivity of 40 S/cm or greater, preferably 50 S/cm or greater and more preferably 70 S/cm or greater at 650° C.

Ceramic Protective Layer

In one embodiment of the present specification, the ceramic protective layer comprises the compound having a spinel structure represented by Chemical Formula 1.

In the present specification, the "ceramic protective layer" is a constitution that may be provided on one surface or both surfaces of a conductive substrate used as an interconnector of a solid oxide fuel cell. The ceramic protective layer of the present specification has an advantage of excellent electrical conductivity while effectively protecting the conductive substrate. FIG. 1 illustrates the interconnect for a solid oxide fuel cell having the ceramic protective layer (2) formed on one surface of the conductive substrate (1).

In one embodiment of the present specification, the ceramic protective layer may be provided on one surface or both surfaces of the conductive substrate, and may be preferably provided on the other surface of the surface adjoining an electrode of the conductive substrate.

By comprising the ceramic protective layer, the interconnect for a solid oxide fuel cell according to one embodiment of the present specification has high electrical conductivity at a high temperature, and thereby has an advantage of increasing efficiency of a solid oxide fuel cell.

Specifically, existing ceramic material have had a problem of low electrical conductivity, but by comprising the compound having a spinel structure of Chemical Formula 1, excellent electrical conductivity may be obtained.

In addition, thermal stress may be minimized by adjusting a coefficient of thermal expansion (CTE) of the interconnect of a solid oxide fuel cell to be similar to coefficients of thermal expansion of other cell components, and particularly, by adjusting coefficients of thermal expansion (CTE) of the conductive substrate and the ceramic protective layer included in the interconnect of the solid oxide fuel cell to be similar. In other words, a coefficient of thermal expansion (CTE) of the ceramic protective layer of the present specification may be adjusted to be similar to a coefficient of thermal expansion of the conductive substrate.

The solid oxide fuel cell according to one embodiment of the present specification comprises a ceramic protective layer comprising the compound having a spinel structure represented by Chemical Formula 1. The spinel structure has a cubic or tetragonal structure, and has properties of suppressing oxygen release even when the crystal structure changes by doping other metals. This has an advantage of low oxygen ion conductivity due to suppressing oxygen ion diffusion. Formation of an insulating layer such as a chromium oxide layer may be prevented since oxygen ion conductivity is low.

The chemical formula of a perovskite structure included in existing ceramic materials is represented by $ABO_3$, and a larger one as a cation is expressed by A, and a smaller one is expressed by B. The element A and oxygen O form a face-centered cubic structure, and B occupies an octahedral site therein. When other elements are doped to the A or B position of $ABO_3$, the existing position of oxygen becomes empty or new oxygen comes in. In other words, a perovskite structure has had a problem of a very high oxygen ion diffusion rate due to high electrical conductivity caused by electron or ion migration, and the present disclosure resolves the above-described problem by introducing a ceramic protective layer comprising the compound having a spinel structure.

In the compound having a spinel structure represented by Chemical Formula 1, copper (Cu) and yttria (Y) are separated at a grain boundary of the spinel composition, and oxygen migration through the grain boundary may be effectively suppressed.

By comprising the compound having a spinel structure represented by Chemical Formula 1, the ceramic protective layer has a very dense protective layer structure, and may effectively suppress insulating oxide layer growth by effectively suppressing gas permeation above the metal.

In addition, the ceramic protective layer has an advantage of having very excellent electrical properties. Specifically, the ceramic protective layer has advantages in that area specific resistance not much increases even when driving for a long period of time at a high temperature, and excellent electrical conductivity is maintained.

The solid oxide fuel cell according to one embodiment of the present specification comprises a ceramic protective layer comprising the compound having a spinel structure represented by Chemical Formula 1.

In one embodiment of the present specification, the compound having a spinel structure represented by Chemical Formula 1 has a form of copper (Cu) and yttria (Y) being doped to a spinel structure formed with manganese (Mn), cobalt (Co) and oxygen (O).

The copper (Cu) is an element having a low melting point of approximately 1,000° C., and functions as a sintering aid when added performing a role of increasing sintering density, and may enhance electrical conductivity of the ceramic protective layer.

The yttria (Y) is separated at a grain boundary of the spinel structure performing a role of suppressing oxygen migration through the grain boundary. Through this, formation of an insulating layer on the protective layer surface is suppressed, and an increase in the electrical resistance of the protective layer may be suppressed, and high electrical conductivity of the ceramic protective layer may be maintained.

The lattice type of the spinel is $AB_2O_4$, a face-centered cubic structure very closely packed with cations A and B and oxygen ions. The spinel may exhibit different properties depending on the types of the cations A and B in the lattice and the compositions. Particularly, when doping copper (Cu) and yttria (Y) to a spinel structure containing manganese (Mn) and cobalt (Co) as main components, high crystallinity of the spinel structure may be maintained by the doped copper and yttria, and release of oxygen ions in the structure may be effectively suppressed even when driving the solid oxide fuel cell for a long period of time at a high temperature. Through this, metal gases such as chromium generated in the conductive substrate being oxidized by oxygen ions may be suppressed, and production of an insulating layer such as a chromium oxide layer may be suppressed.

In one embodiment of the present specification, x1 and x2 represent molar ratios of Cu and Y, respectively, and satisfy ranges of $0<x1\leq0.9$ and $0<x2\leq0.5$. In addition, numerical ranges of $0<x1\leq0.7$ and $0<x2\leq0.4$, numerical ranges of $0.1\leq x1\leq0.5$ and $0<x2\leq0.3$, numerical ranges of $0.2\leq x1\leq0.4$ and $0<x2\leq0.2$, or numerical ranges of $0.2\leq x1\leq0.3$ and $0<x2\leq0.2$ may be preferably satisfied. When satisfying the numerical ranges, the coefficient of thermal expansion is similar to coefficients of thermal expansion of other constitutions of the solid oxide fuel cell, which is advantageous in a thermal expansion behavior, and a low resistance value may be maintained even when driving for a long period of time.

In addition, when satisfying the numerical ranges, both the effect of increasing sintering density of the protective layer by the copper (Cu) included in the spinel structure described above, and an effect of increasing electrical conductivity by yttria (Y) may be obtained.

When the copper content (x1) is less than the above-mentioned numerical range, sintering density of the protective layer is low generating voids, and the effect of increasing electrical conductivity may be insignificant.

When the yttria content (x2) is less than the above-mentioned numerical range, the degree of yttria (Y) being separated at the grain boundary of the spinel structure is insignificant, which may not effectively suppress oxygen migration. Herein, electrical conductivity of the interconnect for a solid oxide fuel cell may decrease by forming an insulating layer on the protective layer surface.

In one embodiment of the present specification, x1 and x2 may each satisfy numerical ranges of $0<x1\leq0.5$ and $x2=0.1$, $0.1\leq x1\leq 0.5$ and $x2=0.1$, $0.2\leq x1\leq 0.4$ and $x2=0.1$, or $0.2\leq x1\leq 0.3$ and $x2=0.1$.

In one embodiment of the present specification, a coefficient of thermal expansion of the ceramic protective layer at 973 K is from $10.0\times10^{-6}$ $K^{-1}$ to $13.0\times10^{-6}$ $K^{-1}$, preferably from $10.5\times10^{-6}$ $K^{-1}$ to $12.5\times10^{-6}$ $K^{-1}$, and more preferably from $11.0\times10^{-6}$ $K^{-1}$ to $12.0\times10^{-6}$ $K^{-1}$. When satisfying the above-mentioned range, interconnect deformation caused by expansion or shrinkage of the ceramic protective layer itself may be effectively suppressed even under a high temperature environment.

The coefficient of thermal expansion of the ceramic protective layer may be measured using methods generally used in the art, and for example, a composition for forming the ceramic protective layer is formed to a pellet bar having a dimension of 3 mm (W)×3 mm (D)×15 mm (L), and changes in the thermal expansion up to 1,300° C. were measured at a temperature raising rate of 5° C./min to 10° C./min using a dilatometer (L75 model manufactured by LINSEIS Messgaraete GmbH).

In one embodiment of the present specification, the compound having a spinel structure represented by Chemical Formula 1 may be $Mn_{1.35}Co_{1.35}Cu_{0.2}Y_{0.1}O_4$, $Mn_{1.30}Co_{1.30}Cu_{0.3}Y_{0.1}O_4$, $Mn_{1.20}Co_{1.20}Cu_{0.5}Y_{0.1}O_4$ or $Mn_{1.40}Co_{0.1}Cu_{0.1}Y_{0.1}O_4$.

In one embodiment of the present specification, a relation between the coefficient of thermal expansion of the ceramic protective layer at 973 K and the coefficient of thermal expansion of the conductive substrate at 973 K may satisfy the following Relation 1 and Relation 2, and may satisfy Relation 1-2 and Relation 2, Relation 1-3 and Relation 2, Relation 1-4 and Relation 2, or Relation 1-5 and Relation 2.

$$0\leq DC\leq 6\% \quad \text{[Relation 1]}$$

$$0\leq DC\leq 5.5\% \quad \text{[Relation 1-2]}$$

$$0\leq DC\leq 5\% \quad \text{[Relation 1-3]}$$

$$0\leq DC\leq 1\% \quad \text{[Relation 1-4]}$$

$$0\leq DC\leq 0.9\% \quad \text{[Relation 1-5]}$$

(DC satisfies the following Relation 2)

$DC$=absolute value of [(coefficient of thermal expansion of conductive substrate at 973 K−coefficient of thermal expansion of ceramic protective layer at 973 K)/(coefficient of thermal expansion of ceramic protective layer at 973 K)]*100(%) [Relation 2]

In one embodiment of the present specification, the relation between the coefficient of thermal expansion of the ceramic protective layer and the coefficient of thermal expansion of the conductive substrate may be measured at 650° C.

When satisfying the relation, the coefficient of thermal expansion of the ceramic protective layer and the coefficient of thermal expansion of the conductive substrate are similar to each other, and thermal compatibility of the ceramic protective layer and the conductive substrate is favorable, which is advantageous in suppressing performance decline in the solid oxide fuel cell even when driving for a long period of time at a high temperature. In existing technologies, a ceramic protective layer and a conductive substrate have different coefficients of thermal expansion, and when driving a solid oxide fuel cell for a long period of time at a high temperature, the degree of shrinkage or expansion of the ceramic protective layer and the conductive substrate adjoining to each other becomes very different. As a result, there is a problem in that cracks occur at an interface of the two structures.

However, according to the interconnect for a solid oxide fuel cell according to the present disclosure, coefficients of thermal expansion of the ceramic protective layer and the conductive substrate are maintained to be similar, and even when driving for a long period of time at a high temperature, cracks occurring at an interface of the two structures may be effectively suppressed.

In one embodiment of the present specification, the ceramic protective layer has a thickness of 10 μm to 30 μm, and preferably 15 μm to 25 μm. Satisfying the above-mentioned numerical range effectively suppresses oxygen ion migration in the ceramic protective layer, and thereby has advantages of preventing chromium oxide layer formation between the conductive substrate and the ceramic protective layer, and maintaining high electrical conductivity.

Conductive Substrate

The solid oxide fuel cell according to one embodiment of the present specification comprises a conductive substrate. The conductive substrate means a substrate having excellent electrical conductivity, and electrical conductivity will be described later.

In one embodiment of the present specification, the conductive substrate is not limited as long as it has high electron conductivity while having low ion conductivity. Generally, ceramic substrates such as $LaCrO_3$ or metal substrates are included, and preferred examples comprise metal substrates.

In one embodiment of the present specification, the conductive substrate may be a ferritic stainless steel (FSS) substrate. Using the ferritic stainless steel substrate as the conductive substrate has advantages in that thermal conductivity is excellent allowing uniform stack temperature distribution, thermal stress may be lowered in a flat plate-type stack, mechanical strength is excellent, and electrical conductivity is excellent.

In one embodiment of the present specification, the conductive substrate has a thickness of greater than or equal to 1 mm and less than or equal to 5 mm, preferably greater than or equal to 1.5 mm and less than or equal to 4.5 mm, and more preferably greater than or equal to 2 mm and less than or equal to 4 mm. Satisfying the numerical range has advantages in that electrical conductivity is high and mechanical strength is excellent.

The ferritic stainless steel may be one type selected from the group consisting of Stainless434 (STS434), Stainless444 (STS444), Stainless430(STS430), Stainless409 (STS409), Stainless410L (STS410L), Stainless441 (STS441), ZMG232 (manufactured by Hitachi Metal, Ltd.) and Crofer22 (manufactured by ThyssenKrupp AG).

In one embodiment of the present specification, the conductive substrate has a coefficient of thermal expansion of $10.5 \times 10^{-6}$ $K^{-1}$ to $12.5 \times 10^{-6}$ $K^{-1}$ and preferably $11.0 \times 10^{-6}$ $K^{-1}$ to $12.0 \times 10^{-6}$ $K^{-1}$ in a temperature range of 873 K to 1073 K and preferably at a temperature of 973 K. When satisfying the above-mentioned numerical range, changes in the conductive substrate size depending on the changes in the temperature may be suppressed.

In one embodiment of the present specification, the ceramic protective layer may be provided on one surface or both surfaces of the conductive substrate, and may be preferably provided on the other surface of the surface adjoining an electrode of the conductive substrate.

Method for Preparing Interconnect for Solid Oxide Fuel Cell

One embodiment of the present specification provides a method for preparing the above-described interconnect for a solid oxide fuel cell comprising forming a ceramic protective layer comprising a compound having a spinel structure represented by the following Chemical Formula 1 on one surface or both surfaces of a conductive substrate.

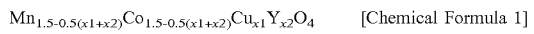

[Chemical Formula 1]

In Chemical Formula 1, x1 and x2 represent molar ratios of Cu and Y, respectively, and satisfy ranges of $0 < x1 \leq 0.9$ and $0 < x2 \leq 0.5$.

In the method for preparing the interconnect for a solid oxide fuel cell according to one embodiment of the present specification, the forming of a ceramic protective layer on one surface or both surfaces of a conductive substrate may comprise preparing a conductive oxide powder by mixing, milling, drying and calcining raw powders; preparing a paste comprising the conductive oxide powder; depositing the conductive oxide powder-comprising paste on one surface or both surfaces of a conductive substrate; and heat treating the result.

In one embodiment of the present specification, the preparing of a conductive oxide powder comprises mixing raw powders; milling the mixed raw powders; drying the result; and calcining the result.

In one embodiment of the present specification, the raw powder comprises one or more selected from the group consisting of $Y_2O_3$ and $Y(NO_3)_3$; and comprises one or more selected from the group consisting of CuO and $Cu(NO_3)_2$. The $Y_2O_3$ and the $Y(NO_3)_3$ are a raw powder of yttria (Y), and the CuO and the $Cu(NO_3)_2$ are a raw powder of copper (Cu).

In one embodiment of the present specification, the raw powder may further comprise one, two or more selected from the group consisting of $MnCO_3$, $Mn(NO_3)_2$, $Co_2O_3$, $Co_3O_4$ and $Co(NO_3)_2$. The $MnCO_3$ and the $Mn(NO_3)_2$ are a raw powder of Mn, and the $Co_2O_3$, the $Co_3O_4$ and the $Co(NO_3)_2$ are a raw powder of Co.

In one embodiment of the present specification, the mixing of raw powders mixes each powder accurately according to the calculated molar ratio, and the calculation is conducted even considering purity of each raw powder by applying a molar ratio using a composition designed to form an $AB_2O_3$ spinel structure. The raw powders and a solvent are introduced to a ball mill container. Materials and types of the ball mill container are not particularly limited, and for example, a container made of a polyethylene (PE) material may be used.

In one embodiment of the present specification, the mixing of the raw powders may be mixing the raw powders in a solvent.

In one embodiment of the present specification, the solvent is not particularly limited as long as it disperses the raw powders and is readily removed by drying, and common materials known in the art may be used. For example, the solvent may comprise one, two or more selected from the group consisting of water, isopropanol, toluene, ethanol, n-propanol, n-butyl acetate, ethylene glycol, butyl carbitol and butyl carbitol acetate, and water or ethanol may be preferably used.

In one embodiment of the present specification, the milling of the mixed raw powders is a process for physically mixing the raw powders mixed with a solvent, and may be mixing for 5 hours to 30 hours under a revolution rate per minute condition of 100 rpm to 2,000 rpm. Herein, a zirconia ball having a diameter of 5 mm, 10 mm or 15 mm is used.

In one embodiment of the present specification, the drying is a process for making the raw powders that have become a liquid state with the solvent to a solid state through drying, and may be performed for 5 hours to 24 hours at a temperature of 90° C. to 200° C. in a circulating dryer. In one embodiment of the present specification, the calcining is a heat treatment process for forming the mixed powders to an $AB_2O_4$ spinel structure, burning organic materials, and producing a solid-state reaction. The calcining may be performed while maintaining for 1 hour to 20 hours or 3 hours to 10 hours under a temperature condition of 1,000° C. to 1,200° C. at a temperature raising rate of 3° C./min to 5° C./min.

In one embodiment of the present specification, the conductive oxide powder may be $(MnCoCuY)_3O_4$ powder, a spinel structure doped with copper (Cu) and yttria (Y).

In one embodiment of the present specification, the method for preparing the interconnect for a solid oxide fuel cell may further comprise re-milling the conductive oxide. The re-milling of the conductive oxide is a process for more finely adjusting a particle size of the conductive oxide powder. The method comprises a jet mill, a bead mill or an attrition mill process.

In one embodiment of the present specification, the particle size of the conductive oxide powder after the re-milling may be from 0.1 μm to 5 μm, and the obtained particle size of the powder may vary depending on the process type.

In one embodiment of the present specification, the jet mill is a method of pulverizing powders by rotating a disk with a pressure of compressed air.

In one embodiment of the present specification, the bead mill is a method of introducing beads into a chamber and pulverizing with rotational force and centrifugal force, and smaller particles may be obtained compared to the jet mill. Herein, smaller sized particles may be obtained when adjusting a speed of the bead mill chamber or a speed of pump injection.

In one embodiment of the present specification, the re-milling may be milling after dispersing the conductive oxide into water.

In one embodiment of the present specification, the preparing of a paste comprising the conductive oxide powder may be preparing a paste by mixing the conductive oxide powder with a dispersant-added dispersion solvent through dispersion, then further adding additives thereto, and mixing the result. The preparing of a paste is a process for mixing various additives as pretreatment before coating the conductive oxide powder.

In one embodiment of the present specification, the additive may further comprise at least one of a binder, a plasticizer and a dispersant. The binder, the plasticizer and the dispersant are not particularly limited, and common materials well known in the art may be used.

In one embodiment of the present specification, the binder may be at least one of a copolymer of poly(butyl methacrylate)-poly(2-ethylhexyl methacrylate) (PBMA-PEHMA), ethyl cellulose (EC), polyvinylisobutyral (PViB) and poly 2-ethylhexyl acrylate (PEHA).

In one embodiment of the present specification, the binder content may be greater than or equal to 20% by weight and less than or equal to 30% by weight based on the total weight of the paste.

In one embodiment of the present specification, the plasticizer may be at least one of di-butyl-phthalate (DBP), di-2-ethylhexyl phthalate (DOP), di-isononyl phthalate (DINP), di-isodecyl phthalate (DIDP) and butyl benzyl phthalate (BBP).

In one embodiment of the present specification, the plasticizer content may be greater than or equal to 3% by weight and less than or equal to 7% by weight based on the total weight of the paste.

In one embodiment of the present specification, the dispersant is not particularly limited as long as it is known in the art, and examples thereof may comprise at least one of BYK-110, BYK-111 and BYK-112.

In one embodiment of the present specification, the dispersant content may be greater than or equal to 0.5% by weight and less than or equal to 2% by weight based on the total weight of the paste.

In one embodiment of the present specification, the dispersion solvent is not particularly limited as long as it disperses the raw powders and is readily removed after preparing the paste, and common materials known in the art may be used. Examples of the dispersion solvent may comprise one, two or more selected from the group consisting of water, isopropanol, toluene, ethanol, n-propanol, n-butyl acetate, ethylene glycol, butyl carbitol and butyl carbitol acetate, and water or ethanol may be preferably used.

In one embodiment of the present specification, the dispersion solvent content may be greater than or equal to 5% by weight and less than or equal to 10% by weight based on the total weight of the paste. When satisfying the above-mentioned range, the raw powders may be favorably dispersed, and the solvent may be smoothly dried in the solvent-drying process.

In one embodiment of the present specification, the method may further comprises, before the depositing of the paste comprising the conductive oxide powder on one surface or both surfaces of a conductive substrate, sand blasting the conductive substrate using metal particles.

The sand blasting is a method of polishing a surface of the conductive substrate with an abrasive such as metal particles or metal oxide particles using compressed air.

Polishing the conductive substrate through sand blasting may provide uniform roughness on the conductive substrate surface and may form micro-bends on the surface, and when forming a ceramic protective layer on the conductive substrate, there is an advantage of increasing adhesion of the ceramic protective layer for the conductive substrate. As a result, the ceramic protective layer being readily peeled off may be prevented.

In one embodiment of the present specification, the metal particle may be one or more selected from the group consisting of SiC, $B_4C$, $CeO_2$, $SiO_2$ and $Al_2O_3$, and may preferably be a metal oxide particle having excellent strength such as $Al_2O_3$. For example, an $Al_2O_3$ particle having a #80 mesh size may be included.

In one embodiment of the present specification, the depositing of the paste comprising the conductive oxide powder on one surface or both surfaces of a conductive substrate may be coating the paste on one surface or both surfaces of a conductive substrate using a screen printing method.

In one embodiment of the present specification, the heat treatment may be performed for 1 hour to 10 hours at a performing temperature of 800° C. to 1,000° C. When satisfying the above-mentioned range, denseness of the coating layer is excellent, and deterioration of the conductive substrate at a high temperature may be suppressed when sintering the ceramic protective layer by the heat treatment.

One embodiment of the present specification provides a solid oxide fuel cell comprising two or more unit cells; and an interconnect layer comprising the above-described interconnect for a solid oxide fuel cell provided between the two or more unit cells, wherein the unit cell comprises a fuel electrode, an air electrode, and an electrolyte provided between the fuel electrode and the air electrode, and the interconnect layer adjoins the air electrode or the fuel electrode of the unit cell.

In one embodiment of the present specification, the unit cell is a most basic unit of the solid oxide fuel cell, and comprises a fuel electrode, an air electrode, and an electrolyte provided between the fuel electrode and the air electrode.

In one embodiment of the present specification, the fuel electrode is not particularly limited as long as it is a material having high stability under a reducing atmosphere, and having high ion conductivity and high electron conductivity. For example, the fuel electrode may be formed with a material mixing nickel oxide (NiO) and yttria stabilized zirconia (YSZ), but is not limited thereto.

In one embodiment of the present specification, the air electrode is not particularly limited as long as it is a material having high stability under an oxidizing atmosphere, and having high ion conductivity and high electron conductivity.

In one embodiment of the present specification, the electrolyte is not particularly limited as long as it is a material having high stability under an oxidizing atmosphere and a reducing atmosphere, and having high ion conductivity and low electron conductivity. Examples of the electrolyte may comprise hydrocarbon-based polymers, fluorine-based polymers, yttria stabilized zirconia, (La, Sr)(Ga, Mg)$O_3$, Ba(Zr, Y)$O_3$, Gd doped $CeO_2$ (GDC), $Y_2O_3$ doped $CeO_3$ (YDC), yttrium stabilized zirconia (YSZ), scandium stabilized zirconia (ScSZ) and the like, but are not limited thereto.

In one embodiment of the present specification, the unit cell may further comprise a sealant. The sealant is not particularly limited as long as it has a similar coefficient of thermal expansion with the fuel electrode, the air electrode and the interconnect of the unit cell, and is capable sealing each of the constitutions. For example, silica, alkali or alkali rare earth oxides, or the like may be included.

In the present specification, the meaning of "adjoin" comprises indirectly adjoining through the interconnect layer as well as directly adjoining.

In one embodiment of the present specification, the interconnect for a solid oxide fuel cell series connects a plurality of the unit cells.

In one embodiment of the present specification, the interconnect of the $m^{th}$ unit cell of a plurality of the unit cells series connects the $m^{th}$ air electrode and the $m+1^{th}$ fuel electrode. m is an integer of 1 or greater.

Hereinafter, the present disclosure will be described in more detail with reference to examples. However, these examples are for more specifically describing the present disclosure, and it is obvious to those skilled in the art that the scope of the present disclosure is not limited to these examples.

EXPERIMENTAL EXAMPLE

<Preparation Example 1>—Preparation of Preparation of Conductive Oxide Powder 1

A composition of starting raw powders was adjusted as Composition 1 of the following Table 1, and after introducing these to a container made of a polyethylene (PE) material, these were mixed together with zirconia (Zr) balls using DI water as a solvent. After that, the result was dried under a condition of 100° C., and then maintained for 3 hours or longer at a temperature of 1,000° C. to 1,100° C. and a temperature raising rate of 3° C./min to 5° C./min to calcine the mixed powders, and Conductive Oxide Powder 1 having a composition of $Mn_{1.35}Co_{1.35}Cu_{0.2}N_{0.1}O_4$ was prepared.

Figure 2:
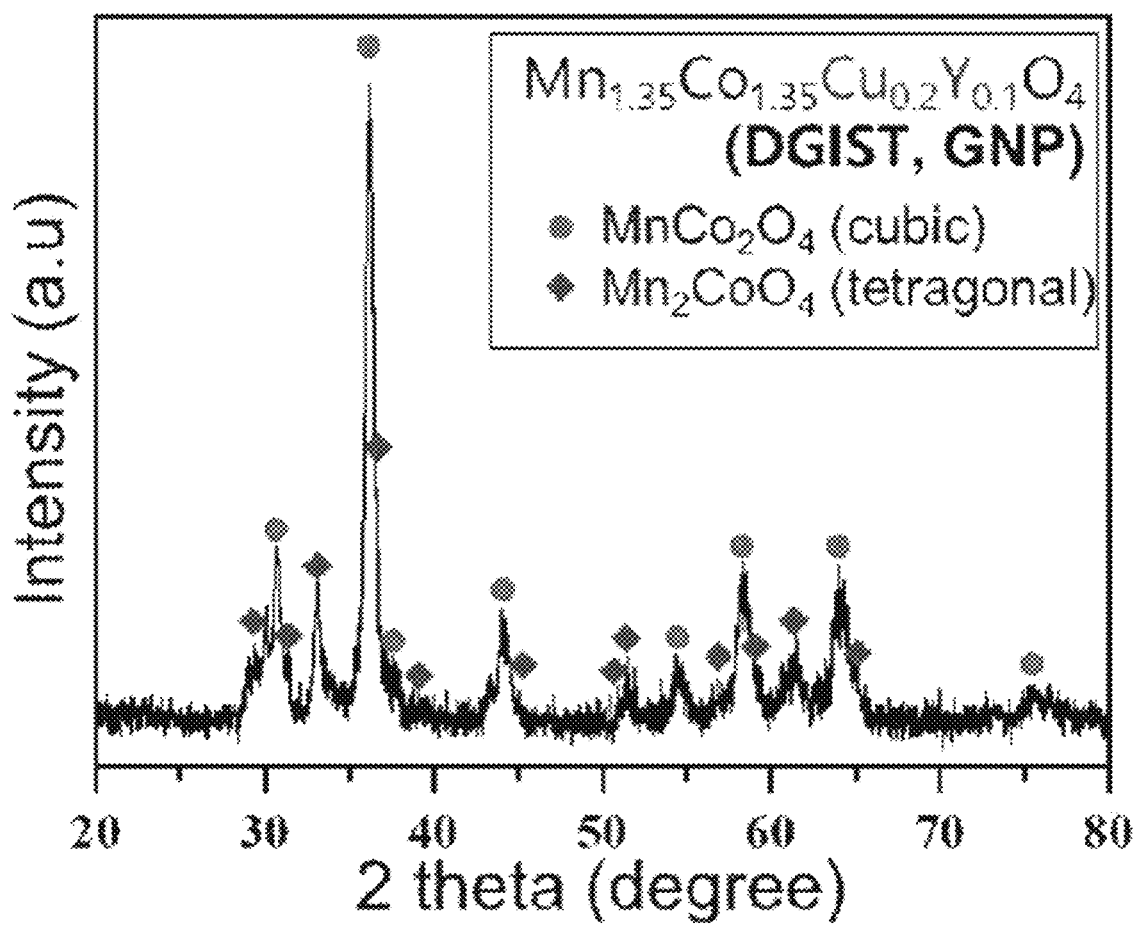
FIG. 2 shows results of measuring XRD of Composition 1 according to Preparation Example 1.

FIG. 2 shows an X-ray diffraction (XRD) spectrum of Conductive Oxide Powder 1, and shows XRD measurement results in order to identify whether the synthesized powder had a spinel structure. As a result of the measurement, it was identified that Conductive Oxide Powder 1 had a spinel structure.

<Preparation Example 2>—Preparation of Conductive Oxide Powder 2

Conductive Oxide Powder 2 was prepared in the same manner as in Preparation Example 1 except that the composition of the starting material powders was adjusted as Composition 2 of the following Table 1.

<Preparation Example 3>—Preparation of Conductive Oxide Powder 3

Conductive Oxide Powder 3 was prepared in the same manner as in Preparation Example 1 except that the composition of the starting material powders was adjusted as Composition 3 of the following Table 1.

<Preparation Example 4>—Preparation of Conductive Oxide Powder 4

Conductive Oxide Powder 4 was prepared in the same manner as in Preparation Example 1 except that the composition of the starting material powders was adjusted as Composition 4 of the following Table 1.

<Preparation Example 5>—Preparation of Conductive Oxide Powder 5

Conductive Oxide Powder 5 was prepared in the same manner as in Preparation Example 1 except that the composition of the starting material powders was adjusted as Composition 5 of the following Table 1.

<Preparation Example 6>—Preparation of Conductive Oxide Powder 6

Conductive Oxide Powder 6 was prepared in the same manner as in Preparation Example 1 except that the composition of the starting material powders was adjusted as Composition 6 of the following Table 1.

<Preparation Example 7>—Preparation of Conductive Oxide Powder 7

Conductive Oxide Powder 7 was prepared in the same manner as in Preparation Example 1 except that the composition of the starting material powders was adjusted as Composition 7 of the following Table 1.

<Preparation Example 8>—Preparation of Conductive Oxide Powder 8

Conductive Oxide Powder 8 was prepared in the same manner as in Preparation Example 1 except that the composition of the starting material powders was adjusted as Composition 8 of the following Table 1.

TABLE 1

| Composition/ Starting Material | $MnCO_3$ | $Co_3O_4$ | CuO | $Y_2O_3$ | Oxide Powder |
|---|---|---|---|---|---|
| Composition 1 | 1.35 | 1.35 | 0.2 | 0.1 | $Mn_{1.35}Co_{1.35}Cu_{0.2}Y_{0.1}O_4$ |
| Composition 2 | 1.30 | 1.30 | 0.3 | 0.1 | $Mn_{1.30}Co_{1.30}Cu_{0.3}Y_{0.1}O_4$ |
| Composition 3 | 1.20 | 1.20 | 0.5 | 0.1 | $Mn_{1.20}Co_{1.20}Cu_{0.5}Y_{0.1}O_4$ |
| Composition 4 | 1.4 | 1.4 | 0.1 | 0.1 | $Mn_{1.40}Co_{1.40}Cu_{0.1}Y_{0.1}O_4$ |
| Composition 5 | 1.20 | 1.20 | 0.1 | 0.1 | $Mn_{1.20}Co_{1.20}Cu_{0.1}Y_{0.1}O_4$ |
| Composition 6 | 1.4 | 1.4 | 0.2 | — | $Mn_{1.4}Co_{1.4}Cu_{0.2}O_4$ |
| Composition 7 | 0.9 | 2 | — | 0.1 | $Mn_{0.9}Co_2Y_{0.1}O_4$ |
| Composition 8 | 1.5 | 1.5 | — | — | $Mn_{1.5}Co_{1.5}O_4$ |

<Preparation of Paste>

<Preparation of Paste 1>

Conductive Oxide Powder 1 prepared in Preparation Example 1, ethyl cellulose as a binder, and butyl carbitol as a dispersion solvent were mixed, and after adding di-butyl-phthalate (DBP) as a plasticizer thereto, the mixture was mixed at a rate of 2,000 rpm using a paste mixer. The primarily formed paste was mixed and pulverized again three times using a 3 roll milling apparatus to finally prepare Paste Composition 1 comprising Conductive Oxide Powder 1. % by weights of Conductive Oxide Powder 1, the binder, the dispersion solvent and the plasticizer with respect to the total weight of Paste Composition 1 are as in the following Table 2.

TABLE 2

| Category | Component | Type | Content (% by Weight) |
|---|---|---|---|
| Paste Composition 1 | Conductive Oxide Powder 1 | $Mn_{1.35}Co_{1.35}Cu_{0.2}Y_{0.1}O_4$ | 65 |
| | Binder | Ethyl Cellulose | 23 |
| | Dispersion Solvent | Butyl Carbitol | 7 |
| | Plasticizer | Dibutyl Phthalate | 5 |

<Preparation of Paste 2>

Paste 2 was prepared in the same manner as in the preparation of Paste 1 except that Conductive Oxide Powder 2 was used instead of Conductive Oxide Powder 1.

<Preparation of Paste 3>

Paste 3 was prepared in the same manner as in the preparation of Paste 1 except that Conductive Oxide Powder 3 was used instead of Conductive Oxide Powder 1.

<Preparation of Paste 4>

Paste 4 was prepared in the same manner as in the preparation of Paste 1 except that Conductive Oxide Powder 4 was used instead of Conductive Oxide Powder 1.

<Preparation of Paste 5>

Paste 5 was prepared in the same manner as in the preparation of Paste 1 except that Conductive Oxide Powder 5 was used instead of Conductive Oxide Powder 1.

<Preparation of Paste 6>

Paste 6 was prepared in the same manner as in the preparation of Paste 1 except that Conductive Oxide Powder 6 was used instead of Conductive Oxide Powder 1.

<Preparation of Paste 7>

Paste 7 was prepared in the same manner as in the preparation of Paste 1 except that Conductive Oxide Powder 7 was used instead of Conductive Oxide Powder 1.

<Preparation of Paste 8>

Paste 8 was prepared in the same manner as in the preparation of Paste 1 except that Conductive Oxide Powder 8 was used instead of Conductive Oxide Powder 1.

<Preparation of Interconnect for Solid Oxide Fuel Cell>

Example 1

Paste 1 was coated on a conductive substrate (STS441) using a screen printing method. After that, the solvent was removed in a circulating dryer at a temperature of 100° C. After that, the result was heat treated for 2 hours at a temperature of 1,000° C. to form a ceramic protective layer having a thickness of 10 μm to 15 and Interconnect for Solid Oxide Fuel Cell 1 was prepared.

Figure 3:
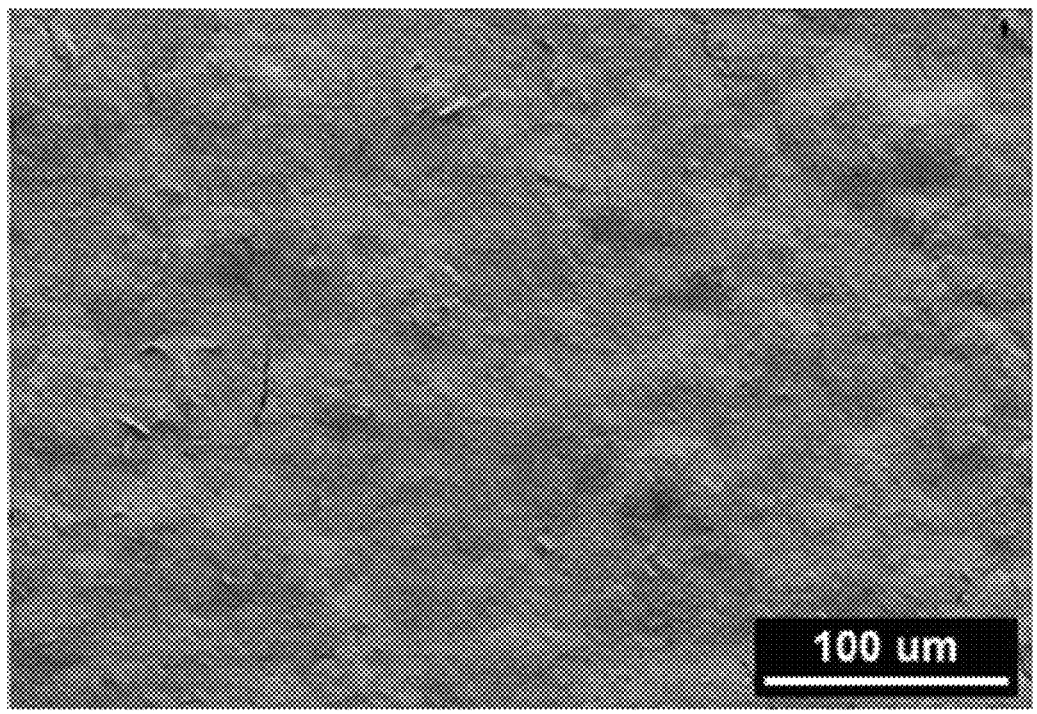
FIG. 3 is a SEM image of a surface of a ceramic protective layer formed on an interconnect for a solid oxide fuel cell according to Example 1.

FIG. 3 is a scanning electron microscope (SEM) image showing the shape of the ceramic protective layer surface according to Example 1, and formation of the ceramic protective layer having a dense structure was identified.

Figure 4:
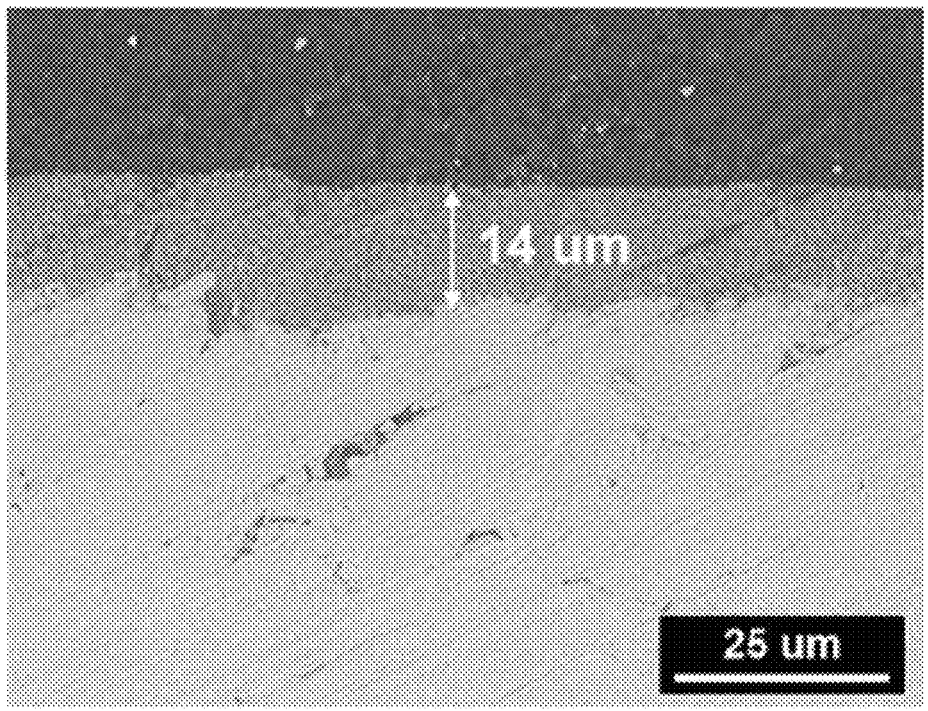
FIG. 4 is a sectional view of an interconnect for a solid oxide fuel cell according to Example 1.

FIG. 4 is a SEM image showing formation of an oxide preventing layer having a thickness of 14 μm between the ceramic protective layer and the conductive substrate according to Example 1.

Example 2

Interconnect for Solid Oxide Fuel Cell 2 was prepared in the same manner as in Example 1 except that Paste 2 was used instead of Paste 1.

Example 3

Interconnect for Solid Oxide Fuel Cell 3 was prepared in the same manner as in Example 1 except that Paste 3 was used instead of Paste 1.

Example 4

Interconnect for Solid Oxide Fuel Cell 4 was prepared in the same manner as in Example 1 except that Paste 4 was used instead of Paste 1.

Comparative Example 1

An interconnect for a solid oxide fuel cell was prepared in the same manner as in Example 1 except that Paste 5 was used instead of Paste 1.

Comparative Example 2

An interconnect for a solid oxide fuel cell was prepared in the same manner as in Example 1 except that Paste 6 was used instead of Paste 1.

Comparative Example 3

An interconnect for a solid oxide fuel cell was prepared in the same manner as in Example 1 except that Paste 7 was used instead of Paste 1.

Comparative Example 4

An interconnect for a solid oxide fuel cell was prepared in the same manner as in Example 1 except that Paste 8 was used instead of Paste 1.

EXPERIMENTAL EXAMPLE

1. Experimental Example 1: Experiment on Electrical Conductivity of Conductive Oxide Powder In order to measure electrical conductivity of the conductive oxide powders, the oxidizing atmosphere was maintained at 650° C., and while injecting an oxidizing gas (nitrogen 80% and oxygen 20%) to a furnace (pot type furnace) with the start, a resistance value for each temperature was identified.

A specimen for measuring electrical conductivity was prepared by forming each of the synthesized conductive oxide powders to a pellet having a dimension of 3 mm (W)×3 mm (D)×15 mm (L), and sintering the pellet in a temperature range of 1,200° C. to 1,300° C. at a temperature raising rate of 5° C./min to 10° C./min. After that, electrical conductivity was measured by measuring a resistance value using a 4-probe measurable digital multimeter, and then calculating conductivity considering a distance between the pellet bar and an electrode.

Figure 5:
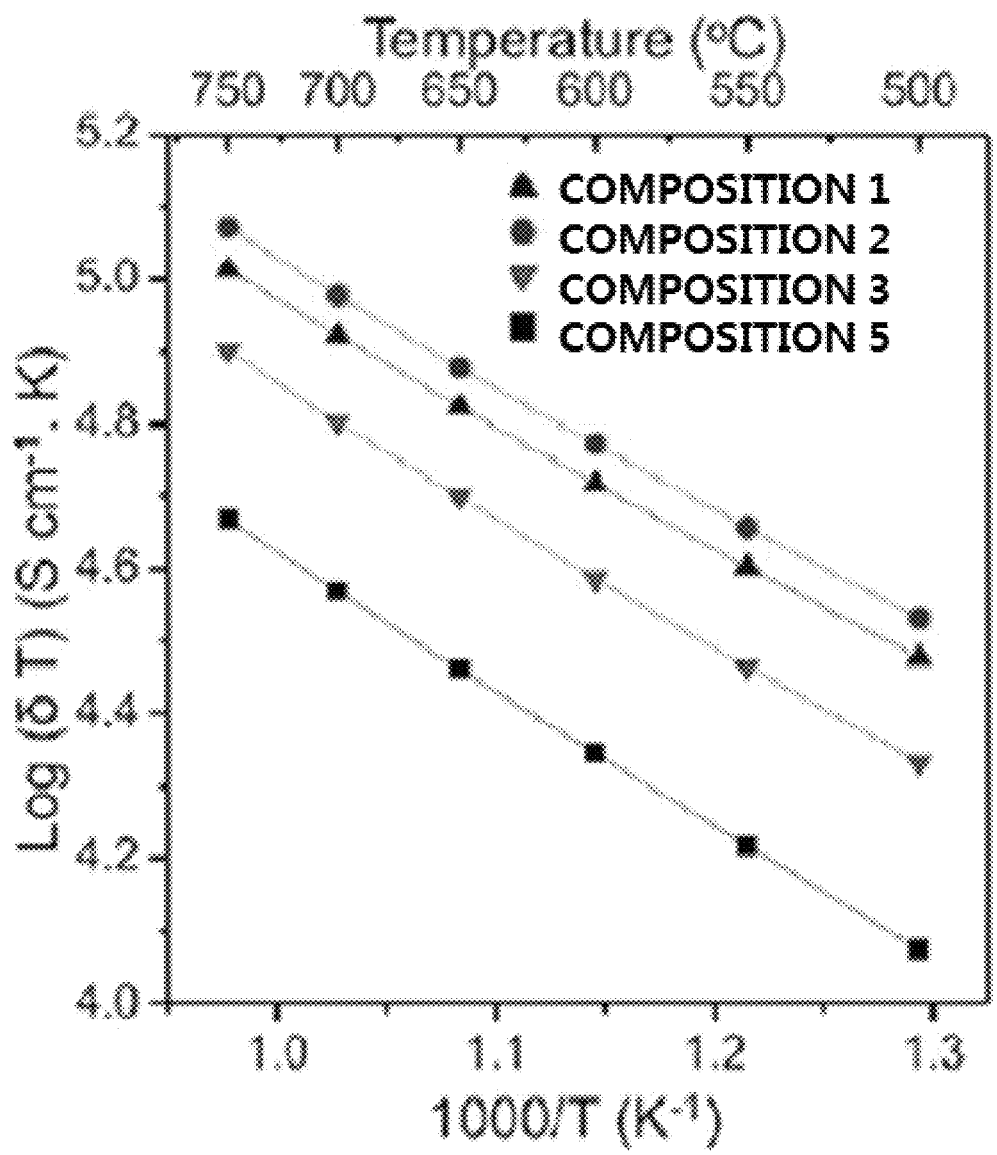
FIG. 5 and FIG. 6 show results according to Experimental Example 1.
Figure 6:
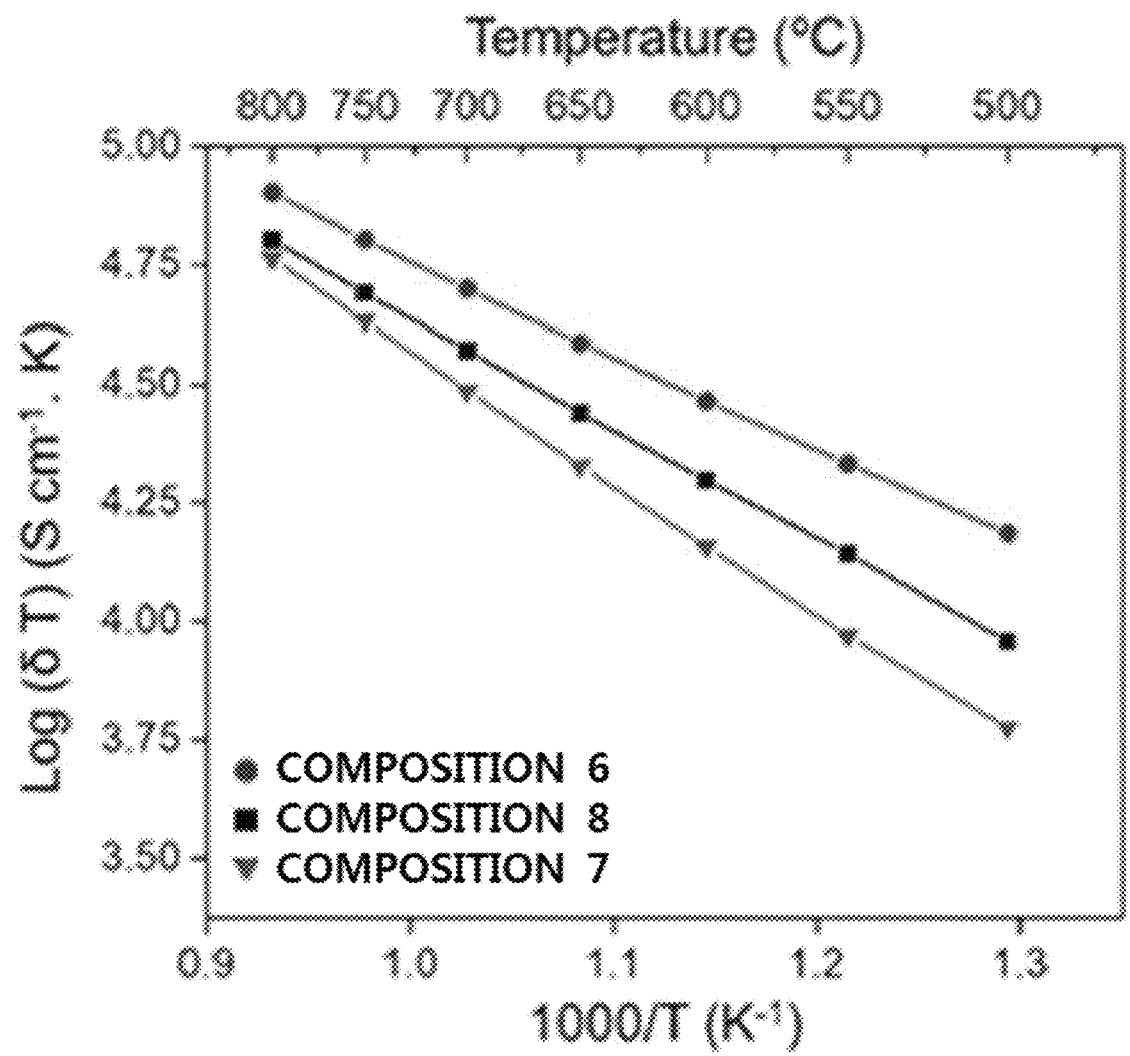

Electrical conductivity measured for each powder may be summarized as in FIG. 5, FIG. 6 and the following Table 3.

TABLE 3

| Composition | Material Powder | Electrical Conductivity (@ 650° C.) |
|---|---|---|
| Composition 1 | Conductive Oxide Powder 1 | 54.2 S/cm |
| Composition 2 | Conductive Oxide Powder 2 | 81.9 S/cm |

TABLE 3-continued

| Composition | Material Powder | Electrical Conductivity (@ 650° C.) |
|---|---|---|
| Composition 3 | Conductive Oxide Powder 3 | 72.3 S/cm |
| Composition 5 | Conductive Oxide Powder 5 | 31.3 S/cm |
| Composition 6 | Conductive Oxide Powder 6 | 38.3 S/cm |
| Composition 7 | Conductive Oxide Powder 7 | 21.6 S/cm |
| Composition 8 | Conductive Oxide Powder 8 | 29.8 S/cm |

Whereas Compositions 1 to 3 had a high electrical conductivity value of 50 S/cm or greater at 650° C., Composition 5 to Composition 8 had a low electrical conductivity value of less than 40 S/cm at 650° C. This is due to the fact that, in the conductive oxide powder, a material of each composition, Composition 1 to Composition 3 included copper (Cu) and yttria (Y) in a certain ratio, and since the yttria and the copper were segregated at a grain boundary of the spinel structure, oxygen migration through the grain boundary was suppressed, and as a result, oxide layer growth on the surface was suppressed by preventing direct contact with oxygen in the atmosphere. In addition, the added Cu is an element having a low melting point, and adding these functioned as a sintering aid performing a role of increasing sintering density, and as a result, high electrical conductivity was obtained.

Meanwhile, Composition 5 ($Mn_{1.20}Co_{1.20}Cu_{0.1}Y_{0.1}O_4$) had relatively low electrical conductivity compared to Compositions 1 to 3, since, although Composition 5 included copper and yttria, the ratios of manganese and cobalt were too low making sintering density relatively low, and electrical conductivity decreased with relatively many pores.

Although some of Compositions 6 to 8 included copper or yttria, these did not comprise both copper and yttria, and therefore, the effect of suppressing oxygen migration was not high.

From such results, it was identified that the powder had excellent electrical conductivity when the spinel structure of the conductive oxide powder included both copper and yttria, and the composition ratios of manganese, cobalt, copper and yttria were as in Compositions 1 to 3.

2. Experimental Example 2: Test on Thermal Compatibility of Ceramic Protective Layer and Conductive Substrate Thermal compatibility of the ceramic protective layer and the conductive substrate was tested. Specifically, coefficients of thermal expansion of the ceramic protective layer and the conductive substrate were compared.

In order to measure a coefficient of thermal expansion of the ceramic protective layer, the conductive oxide powder included in the paste for forming the ceramic protective layer was prepared to a pellet form, and coefficients of thermal expansion of these were measured and compared.

Figure 7:
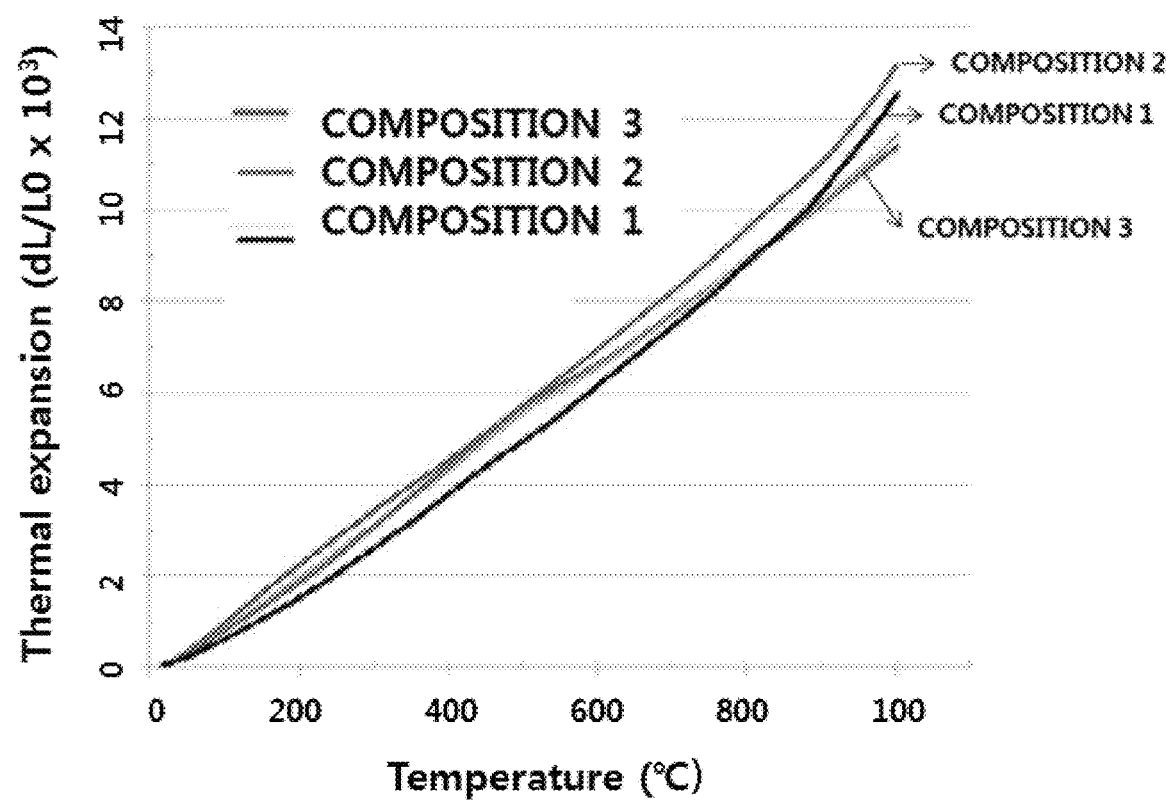
FIG. 7 shows results according to Experimental Example 2.

This may be summarized as in the following Table 4, and coefficients of thermal expansion of Conductive Oxide Powders 1 to 3 were measured and shown in FIG. 7.

As for the coefficient of thermal expansion of the paste, the ceramic protective layer composition was formed to a pellet form having a dimension of 3 mm (W)×3 mm (D)×15 mm (L), and changes in the thermal expansion up to 1,300° C. were measured at a temperature raising rate of 5° C./min to 10° C./min using a dilatometer (L75 model manufactured by LINSEIS Messgaraete GmbH).

Through the coefficient of thermal expansion of the paste and the coefficient of thermal expansion of the conductive substrate (STS430 or STS441), a DC value represented by Relation 2 was calculated. As the coefficient of thermal expansion value of the conductive substrate, $11.40 \times 10^{-6}$ $K^{-1}$ was used.

In this case, the ceramic protective layer and the conductive substrate had similar thermal properties, which was effective in enhancing the whole high temperature durability of the interconnect.

TABLE 4

| Category | Coefficient of Thermal Expansion ($\times 10^{-6}$ $K^{-1}$ @ 973K) | Difference from Coefficient of Thermal Expansion of Conductive Substrate ($\times 10^{-6}$ $K^{-1}$) | DC Value |
|---|---|---|---|
| Conductive Oxide Powder 1 | 11.30 | 0.1 | 0.88% |
| Conductive Oxide Powder 2 | 11.98 | 0.58 | 5.09% |
| Conductive Oxide Powder 3 | 10.85 | 0.55 | 4.82% |

3. Experimental Example 3: Measurement of Area Specific Resistance

In order to evaluate electrical properties under a high temperature oxidizing atmosphere, temperature-dependent area specific resistance (ASR) was measured under the air atmosphere using a DC 4 probe method.

Figure 8:
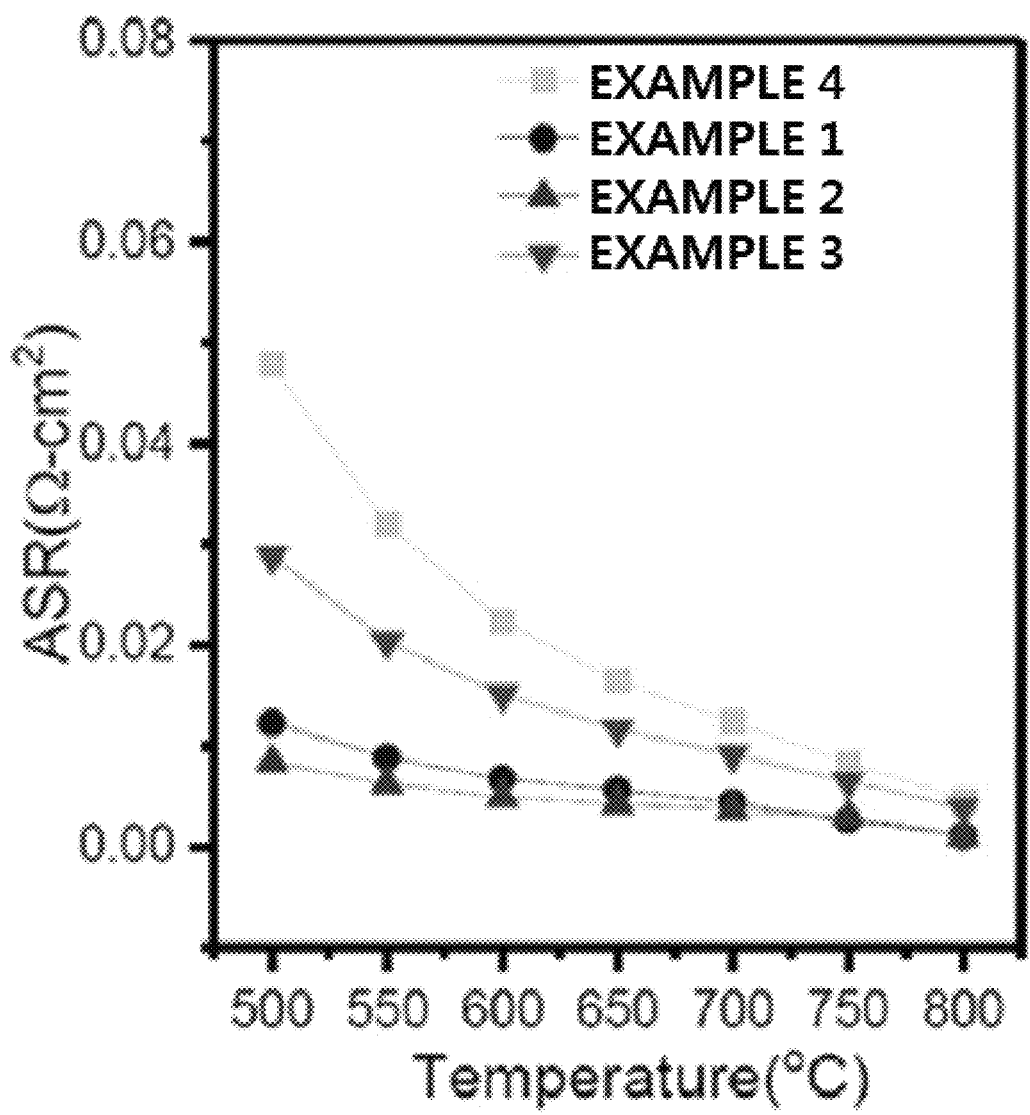
FIG. 8 and FIG. 9 show results according to Experimental Example 3.
Figure 9:
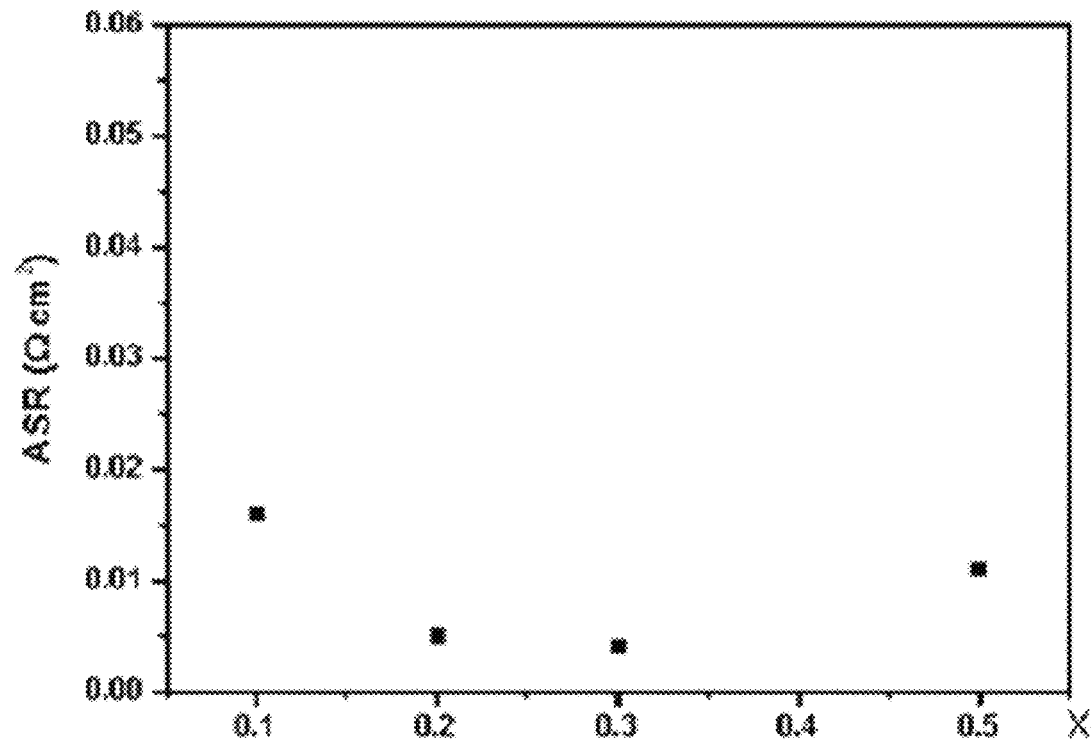

Area specific resistance of each of the interconnects of Examples 1 to 4 was measured and shown in FIG. 8 and FIG. 9. FIG. 8 shows results of measuring area specific resistance values of the interconnects depending on the changes in the temperature, and FIG. 9 shows measurement results at 650° C.

It was identified that the interconnects according to the examples maintained a low resistance value not only at a low temperature of 500° C. but also under a high temperature environment of 800° C. Particularly, it was identified that the interconnects of Examples 1 and 2 had a lower area specific resistance value compared to the interconnects of Examples 3 and 4 at an operating temperature of 500° C. to 800° C. From the results, it was identified that area specific resistance of the interconnect decreased when adjusting the copper content.

4. Experimental Example 4: Long-Term Stability Comparison

Figure 10:
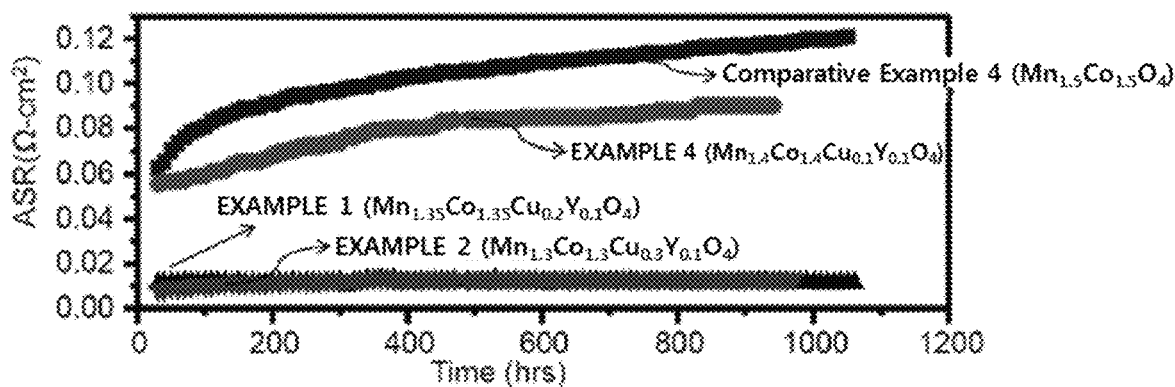
FIG. 10 shows results according to Experimental Example 4.
Figure 11:
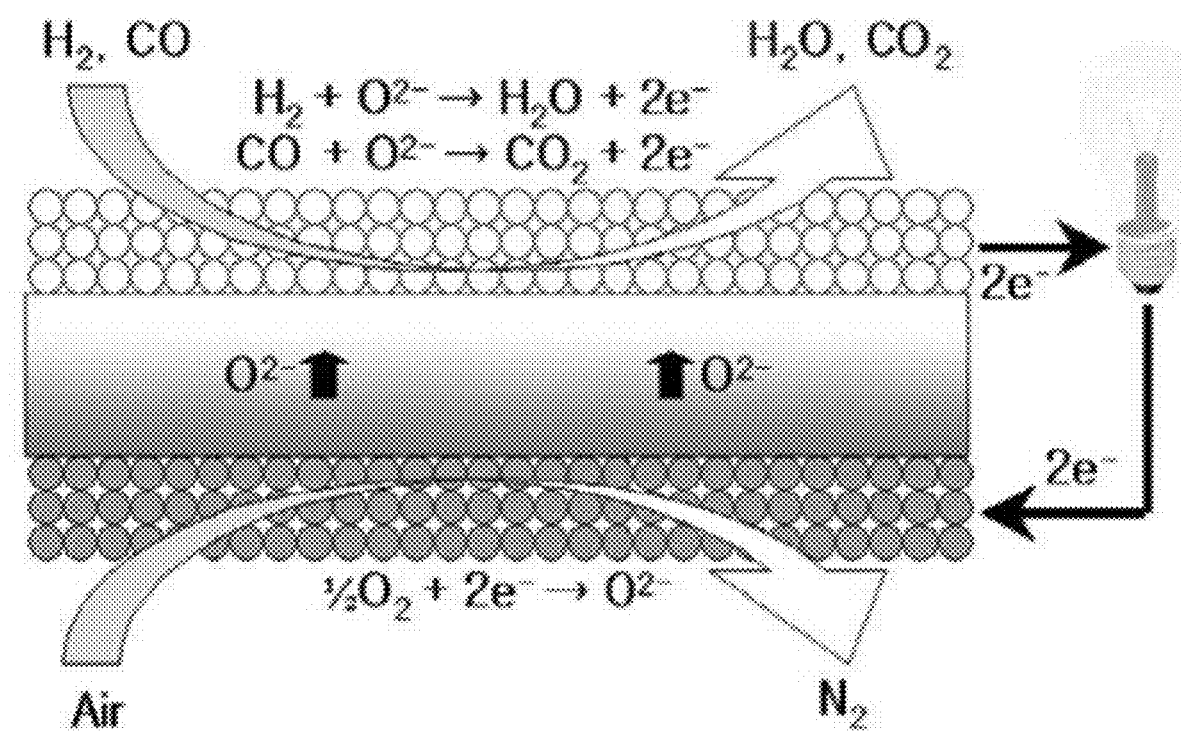
FIG. 11 illustrates one example of an operating principle of a solid oxide fuel cell according to one embodiment of the present specification.
Figure 12:
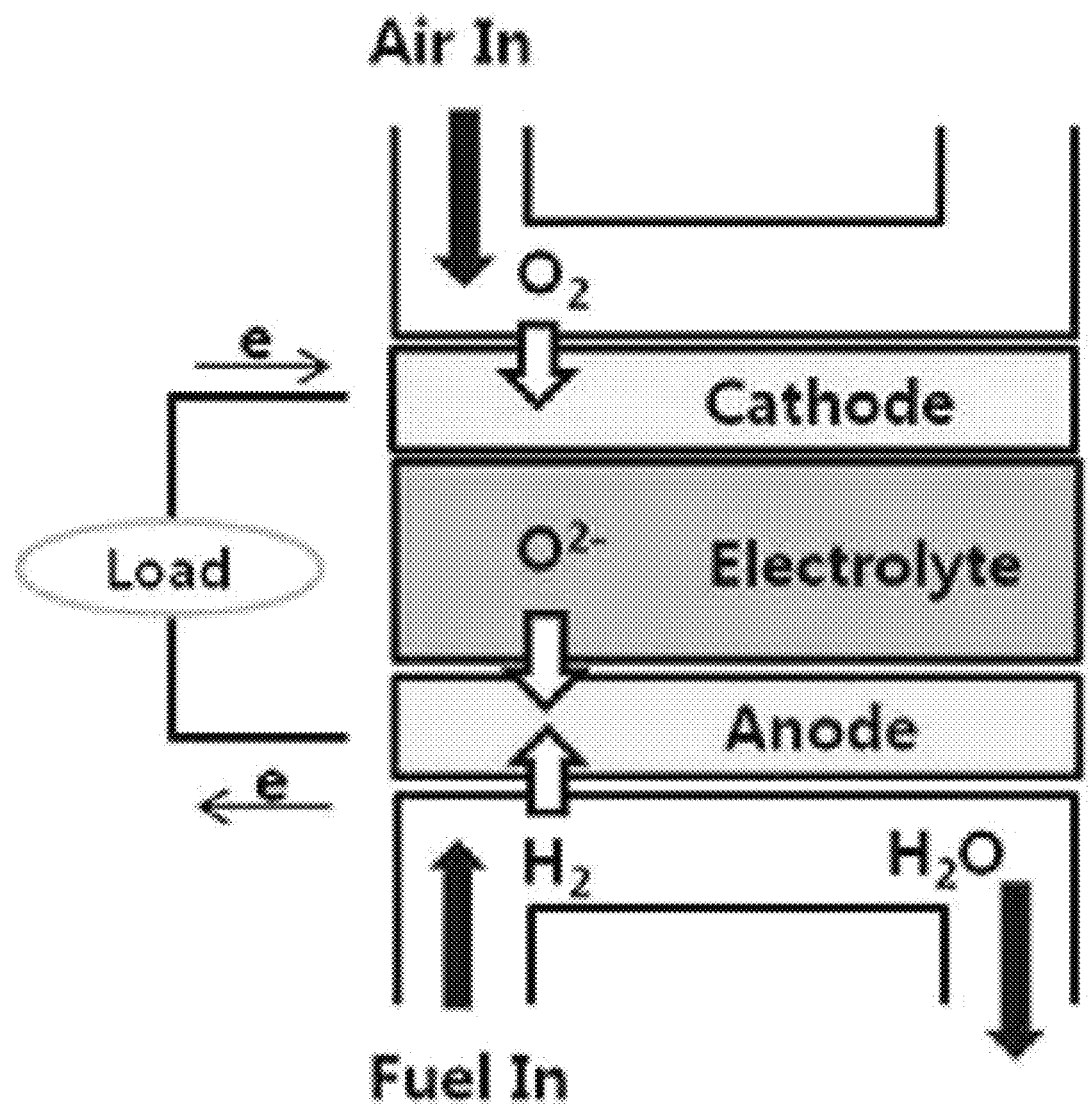
FIG. 12 illustrates a structure of a fuel cell according to one embodiment of the present specification.

In order to measure electrical properties when driving for a long period of time, time-dependent area specific resistance (ASR) was measured under the air atmosphere using a DC 4 probe method. Area specific resistance of the interconnect depending on the changes in the driving time was measured and shown in FIG. 10. Herein, the temperature was 650° C.

It was identified that the interconnects according to the examples maintained a low resistance value not only at the beginning of driving but also when driving for a long period of time. Particularly, it was identified that the interconnects of Example 1 and Example 2 maintained a low area specific resistance value even when driving for a long period of time.

On the other hand, it was identified that the interconnect according to Comparative Example 4 had an area specific resistance value rapidly increasing at the beginning of driving of 200 hours or less. This is due to the fact that, when using the interconnect according to the comparative example, the conductive substrate was deteriorated at a high temperature when sintering the ceramic coating layer by heat treatment. Specifically, the interconnect of Comparative Example 4 that did not comprise copper and yttria had a problem of an area specific resistance value rapidly increasing at the beginning of driving.

However, when using the interconnect according to the example, deterioration of the conductive substrate was effectively suppressed under a high temperature environment, and low area specific resistance was maintained even when driving for a long period of time.

What is claimed is:

1. An interconnect for a solid oxide fuel cell comprising:
a conductive substrate; and
a ceramic protective layer on a first surface of the conductive substrate,
wherein the ceramic protective layer comprises a compound of Chemical Formula 1 that has a spinel structure:

$Mn_{1.5-0.5(x1+x2)}Co_{1.5-0.5(x1+x2)}Cu_{x1}Y_{x2}O_4$ [Chemical Formula 1]

wherein x1 and x2 are molar ratios of Cu and Y, respectively, and $0<x1\leq0.9$, and $0<x2\leq0.5$.

2. The interconnect for the solid oxide fuel cell of claim 1, wherein the ceramic protective layer has a coefficient of thermal expansion in a range of $10.0\times10^{-6}$ $K^{-1}$ to $13.0\times10^{-6}$ $K^{-1}$ at 973 K.

3. The interconnect for the solid oxide fuel cell of claim 1, wherein:

$0\leq DC\leq 6\%$; and $DC$=absolute value of [(a coefficient of thermal expansion of the conductive substrate at 973 K–a coefficient of thermal expansion of the ceramic protective layer at 973 K)/(the coefficient of thermal expansion of the ceramic protective layer at 973 K)]*100(%).

4. The interconnect for the solid oxide fuel cell of claim 1, wherein the ceramic protective layer has a thickness in a range of 10 μm to 30 μm.

5. The interconnect for the solid oxide fuel cell of claim 1, wherein the conductive substrate is a ferritic stainless steel (FSS) substrate.

6. A method for preparing the interconnect of claim 1, the method comprising:
forming the ceramic protective layer on the first surface of the conductive substrate.

7. The method of claim 6, wherein the forming of the ceramic protective layer comprises:
preparing a conductive oxide powder by mixing, milling, drying and calcining raw powders;
preparing a paste comprising the conductive oxide powder;
depositing the paste on the first surface of the conductive substrate to provide a paste containing conductive substrate; and
heat treating the paste containing conductive substrate.

8. The method of claim 7, wherein the raw powders comprise: one or more selected from the group consisting of $Y_2O_3$ and $Y(NO_3)_3$; and one or more selected from the group consisting of CuO and $Cu(NO_3)_2$.

9. The method of claim 7, further comprising, before the depositing of the paste, sand blasting the conductive substrate using metal particles.

10. The method of claim 7, wherein the depositing of the paste is performed using a screen printing method.

11. A solid oxide fuel cell comprising:
a plurality of unit cells comprising a first unit cell and a second unit cell; and
an interconnect layer comprising the interconnect of claim 1 between the first and second unit cells,
wherein the first unit cell comprises a fuel electrode, an air electrode, and an electrolyte between the fuel electrode and the air electrode, and
wherein the interconnect layer adjoins the air electrode or the fuel electrode of the first unit cell.

12. The interconnect for the solid oxide fuel cell of claim 1, wherein:
the ceramic protective layer comprises a first ceramic protective layer and a second ceramic protective layer;
the conductive substrate further comprises a second surface; and
the first and second ceramic protective layers are, respectively, on the first and second surfaces of the conductive substrate.

13. The interconnect for the solid oxide fuel cell of claim 1, wherein $0.2\leq x1\leq 0.5$, and $0<x2\leq 0.3$.

14. The interconnect for the solid oxide fuel cell of claim 13, wherein x2 is 0.1.

15. The method of claim 6, wherein:
the conductive substrate further comprises a second surface; and
forming the ceramic protective layer comprises forming a first ceramic protective layer and a second ceramic protective layer on, respectively, on the first and second surfaces of the conductive substrate.

16. The method of claim 7, wherein:
mixing the raw powders comprises mixing the raw powders with a solvent; and
the solvent comprises one or more of water, isopropanol, toluene, ethanol, n-propanol, n-butyl acetate, ethylene glycol, butyl carbitol, and butyl carbitol acetate.

* * * * *